United States Patent
Kassner

(10) Patent No.: US 10,895,462 B2
(45) Date of Patent: Jan. 19, 2021

(54) METHOD AND SYSTEM FOR COOPERATIVELY GENERATING AND MANAGING A TRAVEL PLAN

(71) Applicant: VOLKSWAGEN AKTIENGESELLSCHAFT, Wolfsburg (DE)

(72) Inventor: Astrid Kassner, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 218 days.

(21) Appl. No.: 16/064,025

(22) PCT Filed: Dec. 20, 2016

(86) PCT No.: PCT/EP2016/082026
§ 371 (c)(1),
(2) Date: Jun. 20, 2018

(87) PCT Pub. No.: WO2017/108858
PCT Pub. Date: Jun. 29, 2017

(65) Prior Publication Data
US 2019/0003842 A1    Jan. 3, 2019

(30) Foreign Application Priority Data

Dec. 22, 2015   (DE) .......................... 10 2015 122 598

(51) Int. Cl.
*G01C 21/34*    (2006.01)
*G01C 21/36*    (2006.01)
(Continued)

(52) U.S. Cl.
CPC ....... *G01C 21/343* (2013.01); *G01C 21/3438* (2013.01); *G01C 21/3605* (2013.01);
(Continued)

(58) Field of Classification Search
None
See application file for complete search history.

(56) References Cited

U.S. PATENT DOCUMENTS

| 2007/0150320 A1* | 6/2007 | Huang | G06Q 10/02 |
| | | | 705/5 |
| 2009/0210143 A1* | 8/2009 | Seltzer | G01C 21/28 |
| | | | 701/532 |

(Continued)

FOREIGN PATENT DOCUMENTS

| DE | 102010061860 A1 | 5/2012 |
| DE | 102015201053 A1 | 8/2015 |
| EP | 1300817 A2 | 4/2003 |

OTHER PUBLICATIONS

International Preliminary Report on Patentability for International Patent Application No. PCT/EP2016/082026; dated Jun. 26, 2018.
(Continued)

*Primary Examiner* — Abdhesh K Jha
(74) *Attorney, Agent, or Firm* — Barnes & Thornburg LLP

(57) ABSTRACT

A method for cooperatively generating and managing a travel plan for a transportation vehicle using at least two user devices. A starting position and a destination position are sensed by the first of the at least two user devices, and the travel plan is generated, wherein the travel plan includes at least one route from the starting position to the destination position and one list of planning objects assigned to the route. A participant enquiry is generated for all the further of the at least two user devices and transmitted to the respective further user device, wherein the participant enquiry is output by the respective further user device, and a user input is sensed as an acceptance. Also disclosed is a system for cooperatively generating and managing a travel plan.

17 Claims, 14 Drawing Sheets

(51) Int. Cl.
*G08G 1/00* (2006.01)
*G06Q 50/30* (2012.01)
*G06Q 10/02* (2012.01)
*G06F 3/0482* (2013.01)
*G06Q 10/04* (2012.01)
*G06Q 50/00* (2012.01)

(52) U.S. Cl.
CPC ......... *G06F 3/0482* (2013.01); *G06Q 10/025* (2013.01); *G06Q 10/047* (2013.01); *G06Q 50/30* (2013.01); *G08G 1/20* (2013.01); *G06Q 50/01* (2013.01)

(56) References Cited

U.S. PATENT DOCUMENTS

| | | |
|---|---|---|
| 2009/0276154 A1 | 11/2009 | Subramanian et al. |
| 2011/0144898 A1 | 6/2011 | Konig |
| 2013/0096819 A1 | 4/2013 | Tarnok |
| 2014/0129143 A1 | 5/2014 | Dave et al. |

OTHER PUBLICATIONS

Basu; Plan an American Road Trip the Right Way with Roadtrippers; downloaded from https://www.guidingtech.com/12507/plan-american-road-trip-right-way-roadtrippers; Jun. 27, 2012.
Search Report for International Patent Application No. PCT/EP2016/082026; dated Mar. 24, 2017.

* cited by examiner

METHOD AND SYSTEM FOR COOPERATIVELY GENERATING AND MANAGING A TRAVEL PLAN

PRIORITY CLAIM

This patent application is a U.S. National Phase of International Patent Application No. PCT/EP2016/082026, filed 20 Dec. 2016, which claims priority to German Patent Application No. 10 2015 122 598.0, filed 22 Dec. 2015, the disclosures of which are incorporated herein by reference in their entireties.

SUMMARY

Illustrative embodiments relate to a method for cooperatively generating and managing a travel plan for a transportation vehicle by at least two user devices. Illustrative embodiments also relate to a system for cooperatively generating and managing a travel plan, wherein the system comprises a transportation vehicle and at least two user devices.

BRIEF DESCRIPTION OF THE DRAWINGS

Disclosed embodiments will now be explained making reference to the drawings.

DETAILED DESCRIPTION

Figure 1:
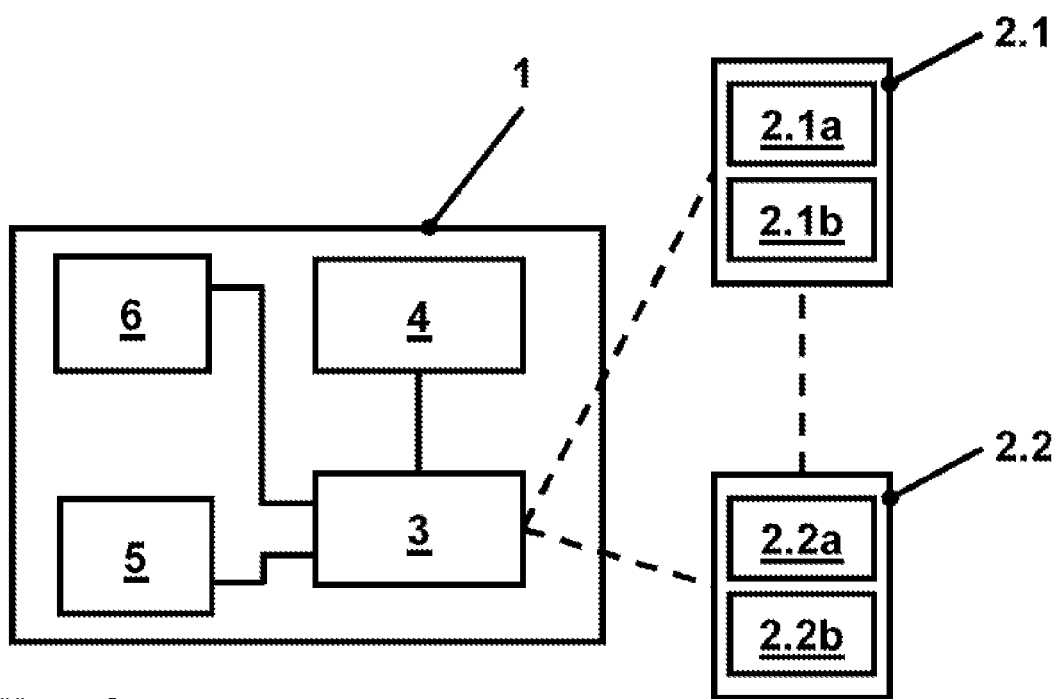
FIG. 1 shows an exemplary embodiment of the disclosed system.

Modern vehicles, in particular, transportation vehicles, provide a multiplicity of options for organizing a trip by electronic devices. For example, navigation devices can be used to generate planning for the route to be travelled. Driver assistance systems are capable of partially or largely taking control of the transportation vehicle right up to controlling the transportation vehicle and its devices fully automatically during the trip.

A system for providing navigation data is known from EP 1 300 817 B1. In this system, route data are emitted, which are selected depending on user preference data. Route data are received by a navigation terminal and used for the routing of the transportation vehicle.

Growing demands are therefore being made on the experience-orientated organization of the trip, in particular, when a plurality of people are participating in the trip.

A system is also known from DE 10 2015 201 053 A1, wherein a video is produced after a trip with a transportation vehicle. It is detected at which GPS coordinates the driver diverts his view away from the travel direction and to a potentially interesting location. On the basis of the GPS coordinates, images are selected from a database and processed into a video.

Furthermore, it is known to store a playlist for music titles on an online platform and to allow further users to change the playlist.

Disclosed embodiments provide a method and a system which enable a cooperative and user-friendly organization of a trip.

In the disclosed method, a starting position and a destination position are sensed by a first of the at least two user devices and the travel plan is generated in an operation at (a), wherein the travel plan comprises at least one route from the starting position to the destination position and a list of planning objects which are assigned to the route. In an operation at (b), a participant enquiry is generated for all the further of the at least two user devices and transmitted to the respective further user device. The participant enquiry is outputted by the respective further user device and a user input is sensed as an acceptance, wherein the first user device and the further user devices for which an acceptance has been sensed are participant devices. In an operation at (c), a display is now generated and outputted by a participant device on the basis of the travel plan. The display comprises a user interface. Travel plan supplementary data are acquired by an input unit of the participant device, wherein the route is assigned at least one further planning object or a planning object assigned to the route is removed. An operation at (d) follows, in which the previous operation at (c) is repeated for as long as further travel plan supplementary data are acquired. The acquired travel plan supplementary data are thereby updated. In an operation at (e), the travel plan is updated on the basis of the acquired travel plan supplementary data, wherein the route and/or the list of the planning objects are newly generated. In an operation at (f), a control signal is generated on the basis of the travel plan and transmitted at least to a navigation device of the transportation vehicle. Finally, in an operation at (g), operations (c) to (f) are repeated as long as further travel plan supplementary data are acquired.

By the disclosed method, the travel plan can be processed and organized cooperatively by a plurality of users. This planning of the trip by the travel plan can take place and/or be continued both before the trip and also during the trip.

The term "trip" is defined as the totality of a journey with a transportation vehicle, the events and geographical information assigned to the journey as well as personal data of persons participating in the journey. Accordingly, the term "travel plan" denotes a totality of data which relate to a trip. The travel plan can relate to a trip lying in the future, wherein it can be used in this case for planning an impending trip, but it can also relate to a past trip, for example, in the sense of a record or a list of the trip.

The travel plan comprises geographical information which is assigned to the trip, in particular, the course of a route, as well as planning objects. "Planning objects" of the travel plan denote data link units, which form functionally related units for the course of the travel plan. Planning objects can, for example, be geographical data, in particular, a starting and destination position of the trip. Planning objects can also comprise other geographical destinations, for example, intermediate destinations or special destinations or Points of Interest (POIs). They can also comprise multimedia contents or links to multimedia contents.

The travel plan comprises a list of planning objects, wherein the latter are assigned to the route. The assignment can take place in terms of time and/or space. For example, a planning object can comprise geographical information and represent a point on a planned route of the trip. Furthermore, planning objects can relate to a specific time during the trip.

The disclosed method makes provision such that the travel plan is generated and managed cooperatively, wherein at least two user devices are used. The user devices can, for example, be a user's mobile devices, but the user devices can also comprise devices of the transportation vehicle, for example, a touchscreen of the transportation vehicle, which is arranged as a central display on the dashboard of the transportation vehicle and is used as an input and output unit. The travel plan can thus be influenced by a plurality of users and by a plurality of user devices.

Initialization is carried out in a first operation of the method, wherein the travel plan is generated. For this purpose, the starting and destination position of a route of the trip are provided as minimal data. Furthermore, a list of planning objects is generated, wherein this list comprises at least the starting and destination position as geographical planning objects.

In a further operation, further user devices are defined as participant devices. A participant enquiry is transmitted to the other user devices and, upon acceptance by a user input, the respective user device is registered as a further participant device.

In a further operation, the users receive the opportunity through the participant devices to output and to process the travel plan. This takes place by a combined input and output unit, for example, a touchscreen. The operation can however also take place using other methods known per se, for example, by a rotate-push actuator or a mouse. The travel plan can be changed, in that planning objects are added to the list of planning objects or planning objects are removed from the list. A modification of the planning objects and/or of the assignment of the planning objects to the route can take place, wherein this can be carried out as a successive removal and new addition of a planning object. The modifications made by a participant device are acquired as travel plan supplementary data. The acquisition of the travel plan supplementary data is continued as long as new data are acquired. For example, many changes to the travel plan can thus be combined.

In a further operation, the travel plan is updated on the basis of the acquired travel plan supplementary data, wherein the route and/or the list of planning objects are newly generated. Finally, a control signal for a navigation device of the transportation vehicle is generated and transmitted on the basis of the travel plan, so that navigation along the route can be carried out.

The operations of acquiring travel plan supplementary data and updating the travel plan can be repeated as long as changes are inputted.

The operation of transmitting a participant enquiry can be repeated, wherein further participant devices can be added. Furthermore, participant devices can be rejected and therefore removed from the series of participant devices or further user devices can be invited and become participant devices.

In a further disclosed embodiment, the travel plan supplementary data comprise planning objects with geographical destinations, wherein the geographical destinations are added as intermediate destinations on the route during the updating of the travel plan on the basis of the travel plan supplementary data. Geographical intermediate destinations of the route can thus be added.

It is thus possible to enable cooperative influencing of the route by all the transportation vehicle occupants. Various participant devices can be used to introduce navigation wishes and adopt the latter in the travel plan. Thus, for example, a restaurant can be added as an intermediate destination of the route.

In a development, a specific participant device is operated as a driver device and the other participant devices are operated as passenger devices. On the basis of the travel plan supplementary data, a confirmation enquiry is generated and outputted by the driver device. An acceptance of the confirmation enquiry is sensed by the driver device and, in operation at (f), the travel plan is updated subject to the sensed acceptance.

It is thus ensured that the driver or the user of the driver device has control over the travel plan. Provision can be made such that individual or a plurality of planning objects or modifications to the travel plan via travel plan supplementary data can be checked by the driver device. Provision can be made such that the confirmation enquiry is generated for specific kinds of travel plan supplementary data, in particular, when adding and/or changing a specific type of planning objects.

In an exemplary embodiment, the confirmation enquiry is generated when the travel plan supplementary data comprise planning objects with geographical destinations.

The user of the driver device thus retains control over the course of the route and the insertion, removal and/or changing of intermediate destinations. For example, users of passenger devices can propose an intermediate destination, wherein the acceptance depends on the user of the driver device. The confirmation enquiry can contain information which makes it easier for the user of the driver device to evaluate the travel plan supplementary data, for example, a travel time, a change to the travel time by acceptance of the confirmation enquiry, a distance indication and/or further information concerning planning objects of the travel plan supplementary data.

In a further disclosed embodiment, when the travel plan supplementary data comprises a plurality of planning objects with geographical destinations, a confirmation enquiry is generated in each case for all the geographical destinations.

Proposals for changing the course of the route by inserting, removing and/or changing intermediate destinations can thus be evaluated individually and, as the case may be, accepted. Furthermore, a combined acceptance or rejection can be enabled by a confirmation enquiry for a plurality or all of the geographical destinations of the travel plan supplementary data.

In a development, the planning objects comprise links to multimedia contents. The multimedia contents can thus be integrated into the travel plan. Multimedia contents can, for example, comprise images, videos, audio data and/or text. The multimedia contents are represented by links, so that the travel plan does not comprise the data itself, but information about how access can be gained to the multimedia contents, in particular, in digital form.

The multimedia contents are linked in terms of space and/or time by the travel plan to the route. For example, the reproduction of a multimedia content can be provided at a specific location on the route or at a specific time during the trip. The reproduction can take place by the transportation vehicle, for example, by a screen at the back of the transportation vehicle, which can be seen by the passengers at the back. The reproduction can also take place by other common devices for media reproduction for passengers of the transportation vehicle. Furthermore, the reproduction can take place via user devices, in particular, via the participant devices. The travel plan can be organized participant-specific, for example, in that the reproduction of a multimedia content is provided for a specific participant.

Furthermore, if the list of planning objects of the travel plan comprises links to multimedia contents, a playlist of the multimedia contents can be generated for a media reproduction device of the transportation vehicle. The playlist comprises information that is required for the reproduction of the multimedia contents, as well as information relating to the respective times for the reproduction of individual multimedia contents. For example, a time or a specific event, for example, the arrival at a specific location along the route, can be defined as a condition for the reproduction of a multimedia content. Furthermore, the playlist can have on ordered sequence of multimedia contents, wherein the reproduction duly corresponds to the sequence of the multimedia contents of the ordered list.

In a further disclosed embodiment, the playlist is generated such that the multimedia contents of the playlist are reproduced following one another or are assigned to specific times or places on the route.

The playlist can be generated such that the multimedia contents of the playlist are reproduced following one another or are assigned to specific times or places on the route. The playlist can be changed, in that a planning object with a multimedia content or a link to a multimedia content is removed, wherein such a planning object is appended at the end of the playlist or wherein the planning object is assigned in terms of time or space to the route. The reproduction of the playlist with the multimedia contents is carried out in such a way that a sequence defined by the playlist is taken into account or a reproduction takes place corresponding to the respective assignment of the planning objects to the route.

In a development, each multimedia content is assigned to a participant device and the link to the multimedia content comprises information concerning the assigned participant device and/or concerning a storage location of the multimedia content.

Each multimedia content is assigned to a participant device, and the link to the multimedia content comprises information concerning the assigned participant device and/or concerning the storage location of the multimedia content. Management of access rights to multimedia contents can thus be implemented. For example, multimedia contents can be stored on individual participant devices or access to the multimedia contents can take place through the individual participant devices. If the list of planning objects comprises links to multimedia contents, the respective planning objects comprise information as to how access can be gained to the multimedia contents. This can take place, for example, by indicating a storage location, from which streaming, for example, or other reproduction of the multimedia content is possible.

Different operating modes can be defined for the user devices. This can, for example, be a public or a private operating mode. The private operating mode can be defined such that no access to contents of the respective mobile device are permitted. In this case, playing of multimedia contents of the user device by a device of the transportation vehicle or by other user devices, for example, is not possible. Furthermore, it can be ensured by the private operating mode that other user devices cannot view and/or use the multimedia contents and/or further data of the mobile device. Conversely, the public operating mode can be defined such that other participant devices can view and/or use the multimedia contents of the user device in the public operating mode. If, in the represented example, the participant device switches into the private operating mode, links to multimedia contents, which are assigned to this participant device, cannot be used for the reproduction of the playlist.

In an exemplary embodiment, the user interface comprises a representation of the route. This enables a display of the planned route, wherein user inputs for the generation of travel plan supplementary data by users of the participant devices can be adapted to the planned route.

In a further disclosed embodiment, the representation of the route comprises a map display or a graphic symbol.

The representation of the route can take place as a map display or as a graphic symbol. The map display enables a detailed display of the route, whereas the route can be represented by an easily and quickly detectable element by a graphic symbol. The representation by a graphic symbol, for example, as a geometrical shape, which is assigned to the route, or by a linear sequence of graphic symbols, a simple display can be achieved if the detailed course of the route is not relevant.

In a development, the user interface comprises user elements, wherein a planning object is assigned to each user element. Furthermore, the user elements are arranged as list entries of a list.

This enables a display of the planning objects within a list, wherein a clear representation can be achieved by structuring the list. Furthermore, the planning objects are thus represented as user elements, i.e., they are represented by graphic objects of the user interface and a condition of these user objects serves for the selection and/or use of the assigned planning objects.

In a further disclosed embodiment, the travel plan supplementary data are acquired on the basis of a user action, wherein the user action comprises a movement of a user element within the user interface.

For example, a user element can be moved, wherein a swipe gesture can be used in an operation by a touchscreen. A user element can be changed spatially within the user interface, for example, a user element can be changed relative to a map display or a graphic symbol which is assigned to the route. This can enable an intuitive operation, if, for example, an intermediate destination, which is assigned to a user element, is to be added to the route.

In an exemplary embodiment, user data are acquired, wherein at least one proposed planning object is determined on the basis of the user data and the list is generated such that a list entry is assigned to the proposed planning object.

For example, personal preferences of a user can be sensed and the planning objects represented in a list can be structured corresponding to these user data. For example, a proposal for a planning object can be generated on the basis of the acquired user data. For example, a restaurant located in the surroundings of the route can automatically be selected, wherein a type of intermediate destinations, for example, restaurants offering a specific regional cuisine, can be preferentially selected. A user-specific selection of possible planning objects can be represented in this way.

In a further disclosed embodiment, the list entries are assigned to categories and displayed on the basis of these categories. This permits a useful structuring and order of the list entries, for example, according to categories such as "restaurants", "nature", "entertainment" and/or "filling stations".

In a development, at least a partial number of the list entries of the list is assigned to planning objects with geographical destinations, wherein the list entries of the geographical destinations are generated on the basis of a distance from the route and/or a geographical location on the route. By a spatial evaluation, it can thus be ensured that relevant geographical destinations are displayed in the list.

For example, potential intermediate destinations can be arranged successively in the list depending on the distance. Furthermore, a grouping can be made, for example, for geographical destinations in specific geographical regions. Furthermore, the generation can be carried out on the basis of a specific or manually set radius or distance. For example, a specific position along the route and a radius can be manually set, wherein the resultant selected list entries correspond to geographical destinations in the region thus defined.

Furthermore, an additional travel time can be taken into account instead of the distance. This is beneficial when the approach to an intermediate destination means an additional lengthening of the travel time.

In an exemplary embodiment, evaluation data are acquired for at least a partial number of the list entries and the list is generated depending on the evaluation data, wherein a travel time is taken into account.

The evaluation data can be acquired, for example, from a database, for example, via the Internet. When the list is generated, the list entries can, for example, be put into a sequence on the basis of the evaluation data according to methods known per se, for example, to display particularly highly regarded or favorite intermediate destinations, for example, restaurants or tourist attractions, before less favored spots. Furthermore, highlighting of specific list entries can be generated. The list entries of the list can also be grouped on the basis of the evaluation data.

In a further disclosed embodiment, the user interface with the list is generated such that the list entries can be actuated and, after an actuation of a list entry, data concerning the assigned planning object can be acquired and outputted.

Thus, for example, additional data can be retrieved in that a list entry is actuated, for example, by selection. This can take place according to methods known per se by retrieving an Internet page or a display with additional data generated by the system.

According to a further disclosed embodiment, at least one of the user devices is a transportation vehicle-external mobile device. Linking of mobile devices into the travel planning can thus be achieved and operations in the travel planning can take place independently of the transportation vehicle. The transportation vehicle-external mobile device can be located in the transportation vehicle, wherein however a permanent connection to the transportation vehicle is not produced. The mobile device can, for example, be a mobile telephone, a tablet computer or another portable computer.

In a development, the at least two user devices are connected by a data link at least temporarily to the transportation vehicle via a server and/or via a direct connection. Cooperative travel planning is thus enabled. Data concerning the travel plan and travel plan supplementary data can be transmitted between the user devices. A transfer of further data for communication between various participants can also take place.

In a development, a position of a user device relative to the transportation vehicle is sensed and a data link connection between the user device and the transportation vehicle is produced depending on the position.

It is thus detected, related to the situation, whether the user device should be connected by a data link to the transportation vehicle. For example, the creation of the data link connection can be associated with the user boarding the transportation vehicle or with an approach towards the transportation vehicle. An exchange of participant devices can also be carried out. For example, the driver of the transportation vehicle can participate in the planning by a mobile device before the start of the trip, and can use a device of the transportation vehicle during the trip, for example, the central display of the transportation vehicle on the dashboard. The role of the driver device can transfer from the mobile device of the driver to the device of the transportation vehicle.

In an exemplary embodiment, travel plan supplementary data, which have been acquired from one of the participant devices, are transmitted to another participant device and displayed by the other participant device, wherein it is indicated which planning object of the travel data supplementary data has been acquired by which participant device.

Proposals for changes can thus be communicated between the participant devices. Proposals from participant devices can be displayed by other participant devices, wherein the display can also comprise information concerning the originator of the proposal.

In a further disclosed embodiment, the user interface comprises a display with information indicating how many participant devices have sensed a specific planning object of the travel plan supplementary data.

A plurality of participant devices can thus also sense a specific change request, in particular, the same planning object can be added to the travel plan by different participant devices. In this case, the display for the participant devices can comprise information indicating from how many and optionally from which participant devices a proposal has been made. The representation can take place for example, by classifying according to the number of proposing participant devices, so that, for example, an evaluation of the proposals can be carried out on the basis of the number of proposals, for example, in the manner of a ballot. The decision between alternative intermediate destinations or planning objects can thus be facilitated, for example, if two different restaurants has been proposed.

In a further development, the user interface comprises a display of a participant list, wherein the participant list is generated on the basis of the participant devices. It can thus be sensed which other participant devices and corresponding participating users are participating in the process of the travel planning.

In a development, message data can be acquired via a participant device. The message data are transmitted to at least one other participant device and outputted by the other participant device. A communication between the participant devices can thus be provided. This can take place in the manner of a short message service or Instant Messenger.

In a further disclosed embodiment, task data are assigned to a participant device and the user interface comprises a task display, wherein information concerning the task data and the assigned participant device are outputted. Tasks can thus be distributed by the user interface.

During a trip, tasks may arise which the participants in the trip typically wish to split up between them. For example, such a task may be to bring along an article. Task data can be generated, for example, by inputting a specific task. On the basis of the task data, a task display is generated, for example, by the representation of a symbol assigned to the task. An assignment can be made to a participant device, for example, by assigning a symbol to an entry in a participant list.

In an exemplary embodiment of the disclosed method, the travel plan is stored and a travel diary request is received. On the basis of the travel diary request and the stored travel plan, the travel diary data are generated and outputted, wherein the travel diary data comprise the route and at least a partial number of the planning objects of the travel plan.

A travel diary can thus be drawn up, which combines central properties of the trip as a kind of record of the trip.

The storage of the travel plan takes place in a volatile or non-volatile manner, in particular, by a storage device of the transportation vehicle. The travel diary request can be generated manually, for example, by a user input. It can also be generated automatically, for example, a travel diary can be generated automatically at the end of a trip. The travel diary request can comprise settings for generating the travel diary, for example, it can be selected which data are to be included by the travel diary. An output of the travel diary data is generated, wherein different formats can be used. For example, the travel diary can comprise a multimedia presentation of the trip. The travel diary can take place by an output device of the transportation vehicle, for example, by a multimedia reproduction device. Furthermore, a printout can, for example, be made or digital data of the travel diary can be transmitted to other devices in the transportation vehicle or outside the transportation vehicle.

In a further disclosed embodiment, the generation request is generated automatically at the end of the trip. The travel diary request can in this case be generated, for example, by a navigation device of the transportation vehicle, when it is recognized that the transportation vehicle has reached the destination position.

In a further disclosed embodiment, the travel diary data comprise a starting position, a destination position, an intermediate position, a travel distance, a travel date, a travel duration and/or a special destination. The course of the trip, in particular, the movement of the transportation vehicle, can thus be recorded.

In a further disclosed embodiment, the travel diary data also comprise a trip title, participant data and/or rating data.

In a development, mood multimedia data, in particular, image data, are acquired simultaneously in the interior of the transportation vehicle and on the exterior of the transportation vehicle and the additional data comprise the mood multimedia data thus acquired. An impression of the trip can thus be stored in the travel diary in the manner of souvenir photos.

In a further disclosed embodiment, the travel diary data comprise multimedia contents and/or links to multimedia contents. Multimedia contents can be included which have been generated during the trip. For example, image data, video data and/or audio data can be acquired by the participant devices and included in the travel diary data. Furthermore, data of a social network with reference to the trip, in particular, with reference to individual multimedia contents, can be included. Furthermore, a playlist with multimedia contents can, for example, be included.

In a development, the travel diary data comprise a playlist for multimedia contents, wherein the playlist comprises information concerning the reproduction of the multimedia contents during the trip.

The playlist comprises information concerning the storage location. It can also comprise data for the identification of the multimedia contents, for example, performer and title of a piece of music. Furthermore, an image, for example, a cover, can be included. Data concerning a storage location or playing options for a multimedia content can also be included.

In an exemplary embodiment, the travel diary data comprising at least one link to multimedia contents, wherein a functionality is assigned to the link.

Information and functional properties can thus be integrated into the travel diary data, for example, to enable retrieval of further information concerning a multimedia content. Furthermore, a functionality can be retrieved, for example, in the manner of a link. Thus, for example, for a multimedia content for the reproduction of which rights have to be acquired, the possibility can be created for acquiring the rights. For example, an Internet page of a music distribution channel can be retrieved through the link.

In a further disclosed embodiment, the travel diary data are constituted by a file format, in particular, a document format, a multimedia format or a presentation format.

Data can thus be outputted as travel diary data and an output of the travel diary data can be outputted by various further devices, for example, by a mobile device with a viewing program for presentations in a specific format.

In a development, the travel diary data are outputted by an output unit of the transportation vehicle.

Viewing of the travel diary by users of the transportation vehicle, for example, can thus take place. The outputting by the output unit of the transportation vehicle can take place directly after the generation of the travel diary data. Furthermore, the travel diary data can be stored and can be outputted at any time in the transportation vehicle. The output unit can be a display unit of the transportation vehicle, for example, a screen, use also being able to be made of further media reproduction devices.

In a further disclosed embodiment, the travel diary data upon being outputted are transmitted to a user device. The user device can be a mobile device, for example, a mobile telephone, a tablet computer or another portable computer of the user. Furthermore, the travel diary data can be transmitted to an external server, for example, for sending by e-mail or for publication of the travel diary data in a social network on another Internet page. Linking to transportation vehicle-external devices and networks can thus take place. The user can share the travel diary data with other people.

In a development, a user input is also sensed and the travel diary data are updated on the basis of the user input. The updated travel diary data are then outputted. The travel diary data can thus be processed For example, the generated travel diary data can be outputted by an output and input device of the transportation vehicle, for example, an infotainment device or another multimedia reproduction device. A user interface can be made available, by which user inputs can take place beneficially.

In a further disclosed embodiment, the travel plan and/or the travel diary data can be stored in a non-volatile manner. The travel diary can thus be drawn up, processed and outputted at a later time. For example, the travel diary data can be stored by a server and made available to further users.

The disclosed system for the cooperative generation and management of a travel plan comprises a transportation vehicle and at least two user devices. The transportation vehicle comprises a navigation system and a control unit. Furthermore, the user devices each comprise an output unit and an input unit. A starting position and a destination position can be sensed by the input unit of a first of the at least two user devices. The travel plan can be generated, wherein the travel plan comprises at least a route from the starting position to the destination position as well as a list of planning objects, which are assigned to the route. A participant enquiry can be generated by the first of the user devices for all the further of the at least two user devices and can be transmitted to the respective further user device, wherein the participant enquiry can be outputted by the respective further user device and a user input can be sensed as an acceptance. The first user device and the further user devices, for which an acceptance has been sensed, are participant devices. A display can be generated and outputted by a participant device on the basis of the travel plan, wherein the display comprises a user interface. Travel plan supplementary data can be acquired by the input unit of the participant device, wherein at least one further planning object can be assigned to the route or a planning object assigned to the route can be removed. The travel plan can be updated on the basis of the acquired travel plan supplementary data, wherein the route and/or the list of the planning objects can be newly generated. A control signal can be generated on the basis of the travel plan and can be transmitted at least to the navigation device of the transportation vehicle.

The disclosed system is constituted to implement the method described above. The system thus has the same benefits as the disclosed method.

In an exemplary embodiment of the disclosed system, the travel plan can be stored and a travel diary request can be received by a sensing unit. Travel diary data can be generated and outputted on the basis of the travel diary request and the stored travel plan, wherein the travel diary data comprise the route and at least a partial number of the planning objects of the travel plan.

This permits a travel diary to be drawn up after completion of a trip. The travel diary request can be generated for example, on the basis of a user input or can be generated automatically at the end of the route. In a development of the system, the travel diary data upon being outputted can also be transmitted to a user device.

The travel diary data can thus be stored, processed, outputted and/or passed on by transportation vehicle-external user devices.

With regard to FIG. 1, an exemplary embodiment of the disclosed system according is explained.

A transportation vehicle 1 comprises a control unit 3, to which a navigation device 6, a media reproduction device 5 and a touchscreen 4 are connected. Touchscreen 4 comprises a display area, which comprises a touch-sensitive surface. For this purpose, a film, for example, can be arranged over the display area, with which the position of the touch of an activation object can be detected. The activation object is a user's fingertip. The film can be constituted, for example, as a resistive touch film, a capacitive touch film or a piezoelectric film. Furthermore, the film can be constituted such that a heat flow, which is emitted, for example, from the fingertip of a user, is measured. From the course of the touching of the film over time, various inputs can be obtained. For example, in the simplest case, the touching of the film at a specific position can be sensed and assigned to a graphic object displayed on the display area. Furthermore, the duration of the touching at a specific position or within a specific area can be sensed. Furthermore, gestures can be sensed, wherein the temporal change of an uninterrupted touch is sensed for this purpose.

Control unit 3 is detachably connected by a data link to at least a first mobile device 2.1 and a second mobile device 2.2. Both mobile devices 2.1, 2.2 are, for example, mobile telephones, tablet computers or other portable computer devices. The data link connection can be produced in various ways known per se, for example, by a radio connection. A WLAN network or a BLUETOOTH® connection can be used. Furthermore, mobile devices 2.1, 2.2 are connected to one another by a data link, wherein control unit 3 and the two mobile devices 2.1, 2.2 are in the same network. In the exemplary embodiment represented, two mobile devices 2.1, 2.2 of the same type are provided, which each comprise a display unit 2.1a, 2.2a and an input unit 2.1b, 2.2b. Touchscreens are provided, by which display units 2.1a, 2.2a and input units 2.1b, 2.2b are combined.

The data link connections of mobile devices 2.1, 2.2 and control unit 3 of transportation vehicle 1 are independent of one another, i.e., even if there is no connection to control unit 3, mobile devices 2.1, 2.2 can, for example, be connected to one another.

With regard to FIG. 1, an exemplary embodiment of a disclosed method is explained.

Touchscreen 4 of transportation vehicle 1 and the two mobile devices 2.1, 2.2 are user devices, i.e., they enable a user to interact with the system. User inputs can be sensed and data can be outputted.

In a first operation, the starting position and destination position of a desired route are inputted. This takes place in a manner known per se by a user input, which takes place by touchscreen 4 or input unit 2.1b, 2.2b of one of mobile devices 2.1, 2.2. In the exemplary embodiment represented, navigation device 6 of transportation vehicle 1 generates a route for transportation vehicle 1 from the starting position to the destination position. In further exemplary embodiments, this route can be generated, for example, by one of mobile devices 2.1, 2.2.

A travel plan is generated, which comprises the route and a list of planning objects. In the exemplary embodiment, the list of planning objects comprises in the first place the starting position and destination position. The latter are represented by geographical planning objects of the list. They are assigned to the route, in this case spatially as the starting point and end point of the route.

In further exemplary embodiments, the list of planning objects can comprise further automatically supplemented planning objects, in particular, further geographical planning objects, such as, for example, charging stations along the route for charging an electrical energy storage unit or filling station positions for filling up a fuel storage unit as well as links to multimedia contents, for example, for reproducing a radio station during the trip.

In a further operation, participant enquiries are transmitted to the other user devices of the system. If, in the represented example, the travel plan has been generated on the basis of the devices of transportation vehicle 1, participant enquiries can be transmitted, for example, to mobile devices 2.1, 2.2 and generated for the latter. In this case, an acceptance of a participant enquiry can be sensed in each case by input units 2.1b, 2.2b of mobile devices 2.1, 2.2.

In the represented example, touchscreen 4 of transportation vehicle 1 is also operated as a driver device and mobile devices 2.1, 2.2 as passenger devices. In a further exemplary embodiment, a mobile device 2.1, 2.2 is firstly the driver device and, when the driver boards transportation vehicle 1, this task is taken over by touchscreen 4, since the driver typically does not use a mobile device 2.1, 2.2 while driving transportation vehicle 1.

For example, a user can generate a proposal for a trip along the route via one of user devices 2.1, 2.2, 4. Potential passengers can then be invited, whereby a participant enquiry is transmitted to their respective user devices 2.1, 2.2, 4. All user devices 2.1, 2.2, 4, for which a participation has been sensed, are now "participant devices" 2.1, 2.2, 4.

In a further operation, the users can retrieve and process the travel plan. For this purpose, a user interface is generated for respective user devices 2.1, 2.2, 4. By the latter, information concerning the travel plan can be outputted and user options are provided for changing the travel plan. The potential changes relate to the list of planning objects. Data for supplementing and/or changing the travel plan can be acquired by user inputs. Further planning objects can be added to the list or they can be removed from the list. Furthermore, the assignment of individual planning objects to the route can be changed. In a further operation, the travel plan is updated on the basis of the sensed user inputs for changes to the travel plan and the route and the list of planning objects are newly generated. By a control signal, which is generated on the basis of the travel plan, a navigation is carried out by navigation device 6 of transportation vehicle 1. Guidance along the planned route takes place, wherein the planning objects which are assigned to the route are taken into account.

The previously described operations for sensing user inputs for changing the travel plan or for regenerating the travel plan can be repeated as long as corresponding user inputs are sensed.

Figure 2:
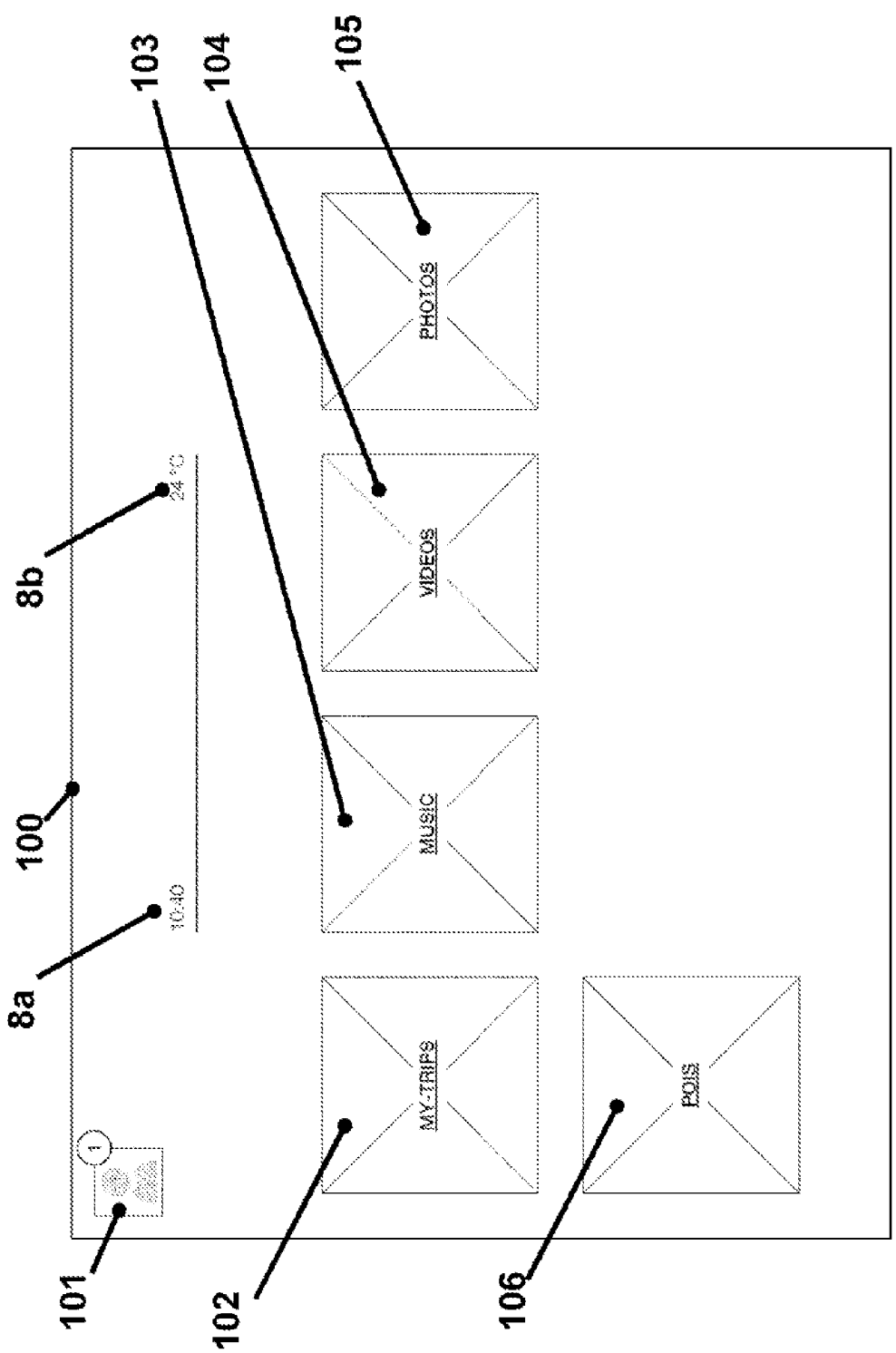
FIGS. 2, 3, and 4 show exemplary displays for the interaction of the users with the disclosed system.
Figure 3:
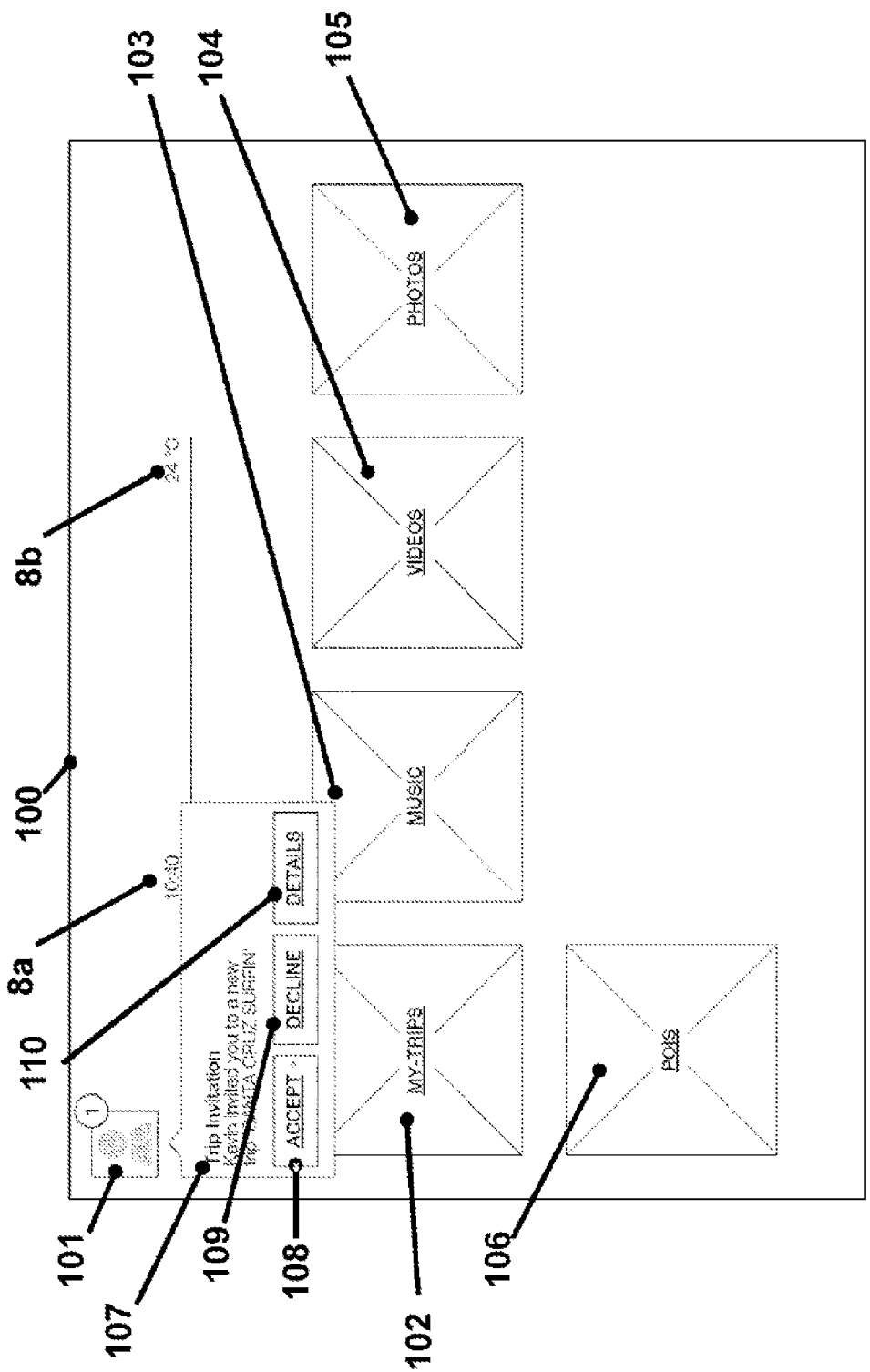
Figure 4:
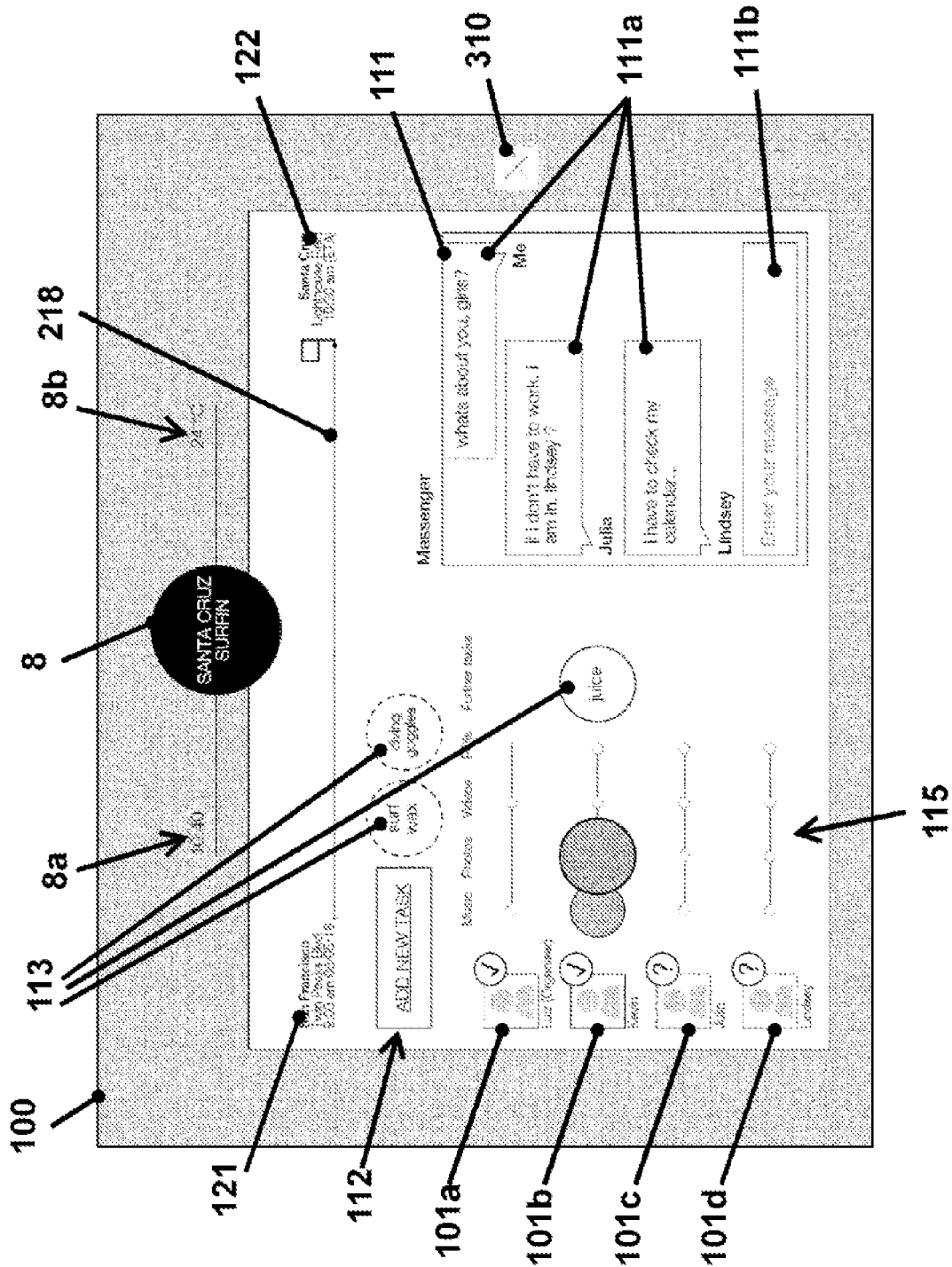

With regard to FIGS. 2, 3 and 4, displays for the interaction of users with the disclosed system are explained by way of example. They proceed from the system and method explained in respect of FIG. 1.

In the exemplary embodiment, display 100 represented in FIG. 2 is outputted by one of mobile devices 2.1, 2.2. The output takes place by a touchscreen of mobile device 2.1, 2.2, wherein the user can carry out user inputs by touching the touchscreen.

Display 100 comprises information concerning time 8a and temperature 8b, a user image 101 also being represented. Display 100 also comprises buttons 102-106, by which various applications or functions of mobile device 2.1, 2.2 can be selected. In the case represented, these applications relate to a collection of trips in the past ("My Trips"), a music selection ("Music"), a video selection ("Videos"), a photograph selection ("Photos") as well as a selection of special destinations (Points of Interest, POIs).

In the case represented in FIG. 3, a participant enquiry has been received. In contrast with the case represented in FIG. 2, display 100 is supplemented by a pop-up 107 with an invitation message. The pop-up also comprises buttons for accepting 108, for declining 109 and for retrieving details 110 concerning the planned trip.

When the user declares his participation in the trip by selecting the button "accept" 108, respective mobile device 2.1, 2.2 is then a participant device.

FIG. 4 shows display 100 for the case where a plurality of users have received a participation request, wherein two of the users (Luiz, Kevin) have accepted their participation and two (Julia, Lindsey) have not commented. This is represented by a graphic identification of represented user images 101a to 101d, wherein a tick is represented in the case of user images 101a, 101b, from whose assigned user devices 2.1, 2.2 a confirmation of participation has been received, and a question mark in the case of user images 101c, 101d, from whom an accept or decline is pending. Display 100 also comprises a description of trip name 8, in the case represented as a circular symbol with writing. Furthermore, the planned route is represented symbolically by a straight line 218, which runs from a starting position 121 to a destination position 122. Display 100 also comprises task objects 113, in the case represented round symbols with writing. Task objects 113 can be newly generated by operating a button 112. In the case represented, three task objects 113 are represented, wherein one of them assigned to a user, who is represented by the corresponding user image 101b and his name "Kevin". This can mean, for example, that the passenger Kevin will bring along juice. The two further task objects 113 for "Surf Wax" and "Diving Goggles" are not assigned to any user. Display 100 further comprises a representation of planning contributions 115, wherein it is represented by graphic symbols how much a user has contributed to the planning of the trip in various categories ("music, photos, videos, POIs"). In the example represented, it can be seen that user Kevin has already contributed music and a fairly large number of photos.

Display 100 also comprises a message window 111, i.e., an area in which instant messages 111a can be displayed and new instant messages can be inputted by a message input field 111b. Display 100 also comprises a button 310 for closing the application or the function of the application just executed.

Figure 5:
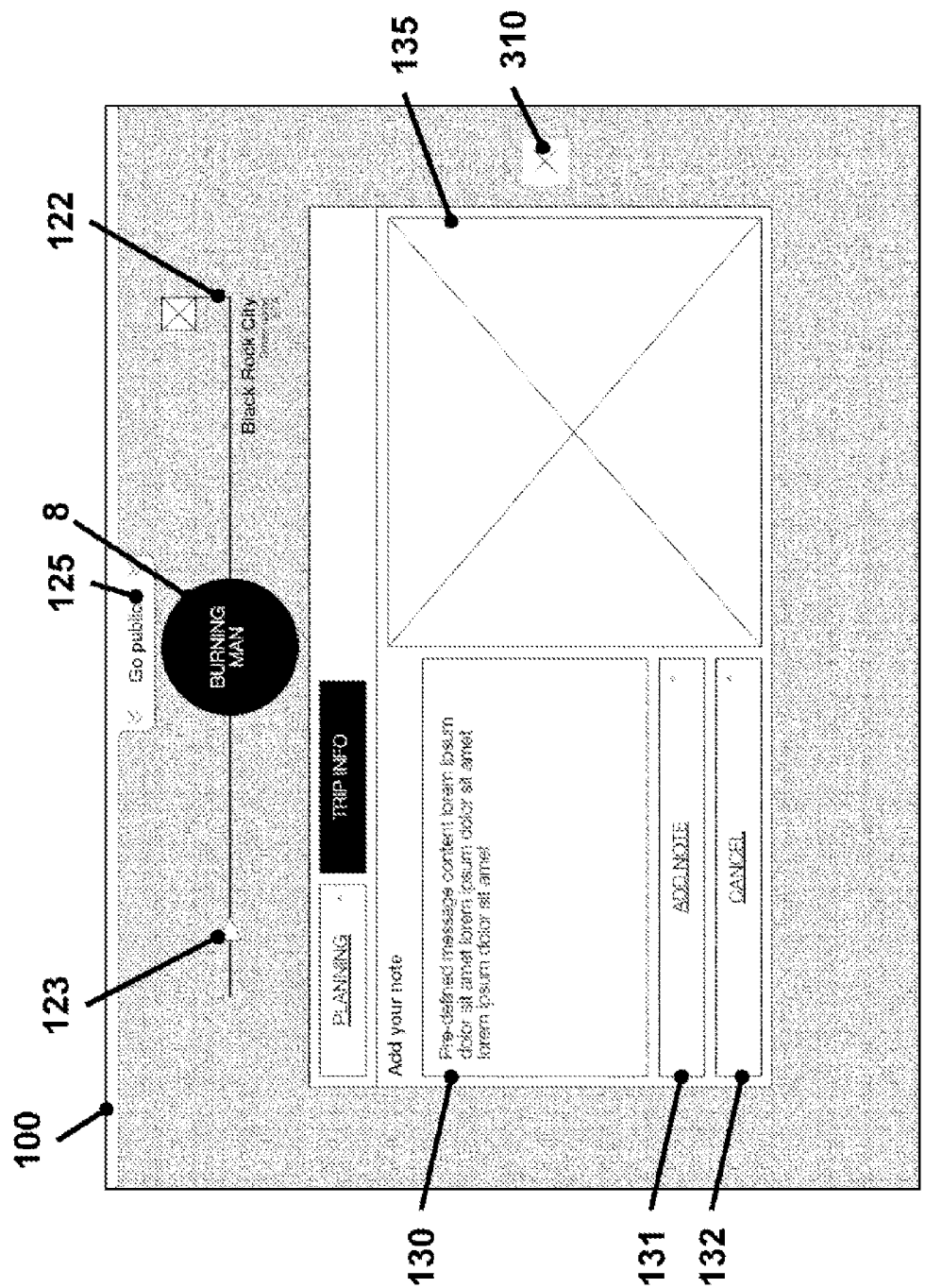
FIG. 5 shows a display for the addition of notes concerning a route.

With regard to FIG. 5, a display for adding notes concerning a route is explained. It proceeds from the exemplary embodiment of the disclosed system and disclosed method explained above.

Represented display 100 enables the user to generate and process a note, which is assigned to the trip, to a location on the trip or to a time during the trip. In the exemplary embodiment represented, a note is generated in a private mode, recognizable by the representation of the button "Go public" 125 at the upper edge of display 100. By actuating this button, the user can switch into a public mode and, for example, make public his privately produced note, so that it can be seen and/or processed by all the users. Provision is made in the private mode such that only the user himself can access his note and optionally process the latter.

Display 100 comprises a user interface with an upper region with trip name 8 and a simplified description of the itinerary on the basis of a straight line, on which a current position 123 is represented by an arrow symbol and destination position 122 is represented symbolically. Furthermore, a note field 130 is included, into which the user can input text by methods known per se, for example, by a keyboard. Furthermore, the represented user interface comprises a button "Add Note" 131, by which a new note can be generated, as well as a button "Cancel" 132, by which the generation of the note can be stopped. Furthermore, as already described above, button "Close" 310 is represented. Display 100 further comprises a display field 135, in which, for example, an image in connection with the note can be displayed.

Figure 6:
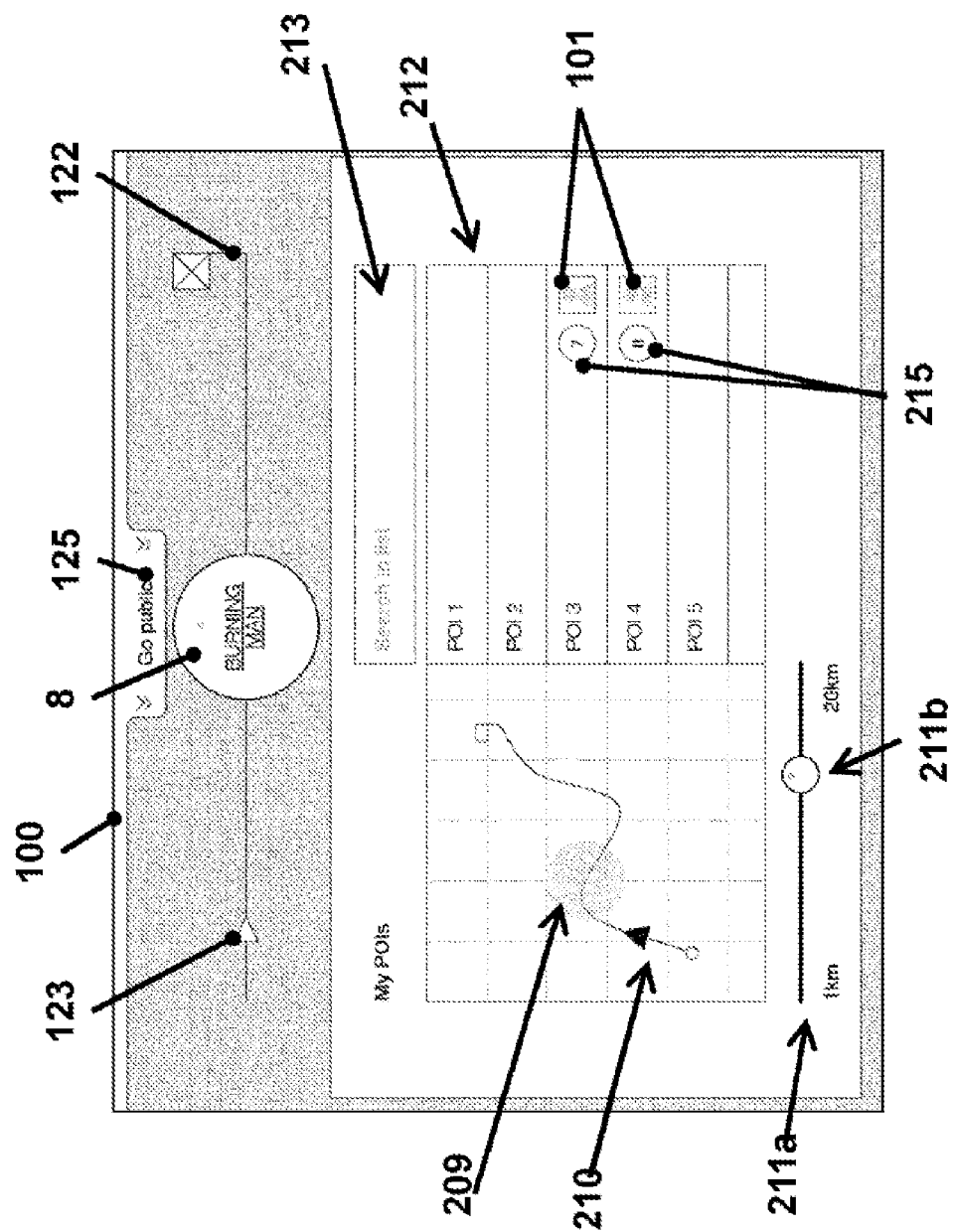
FIGS. 6, 7, and 8 show displays for the cooperative planning of intermediates destinations on a trip.
Figure 7:
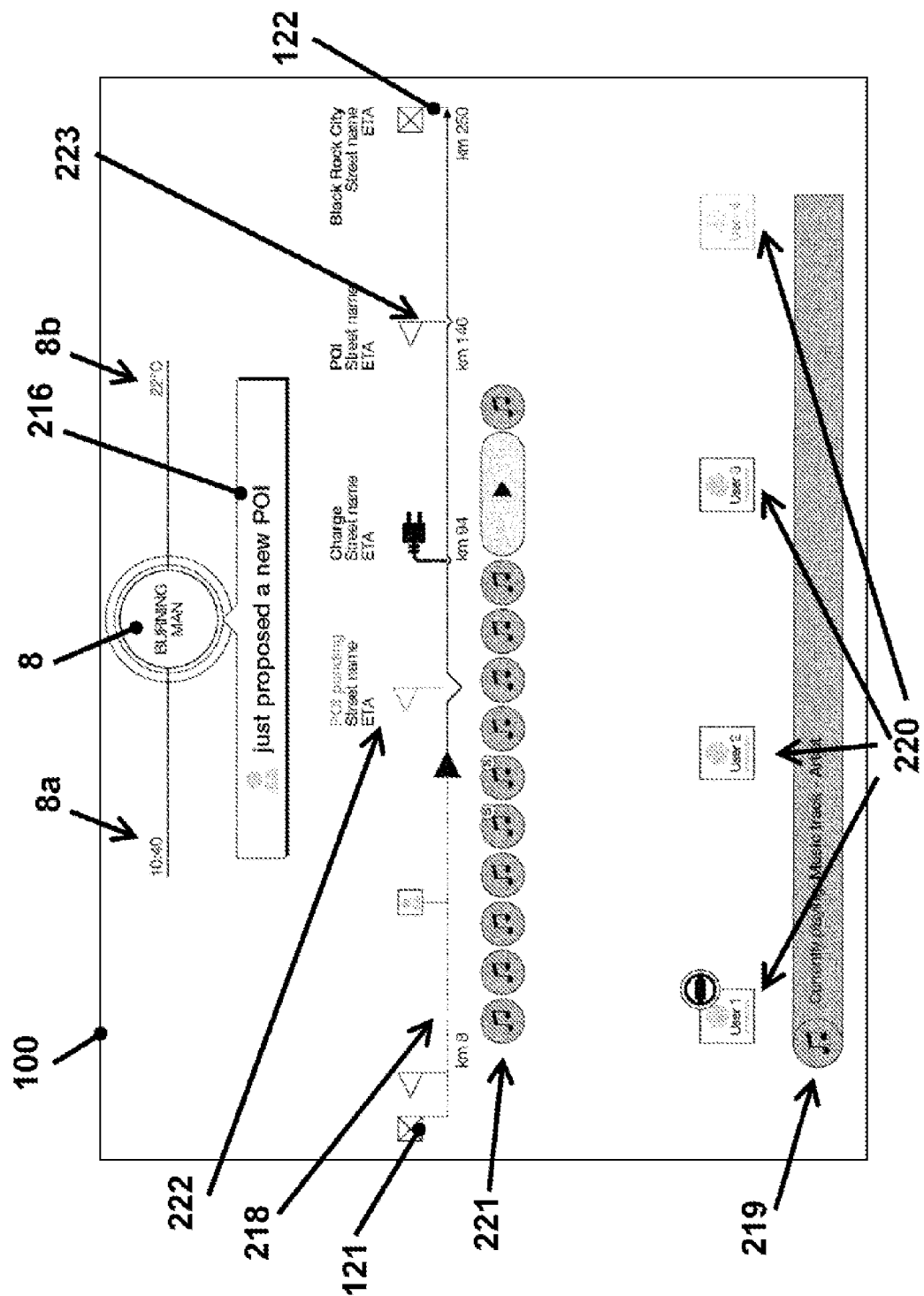
Figure 8:
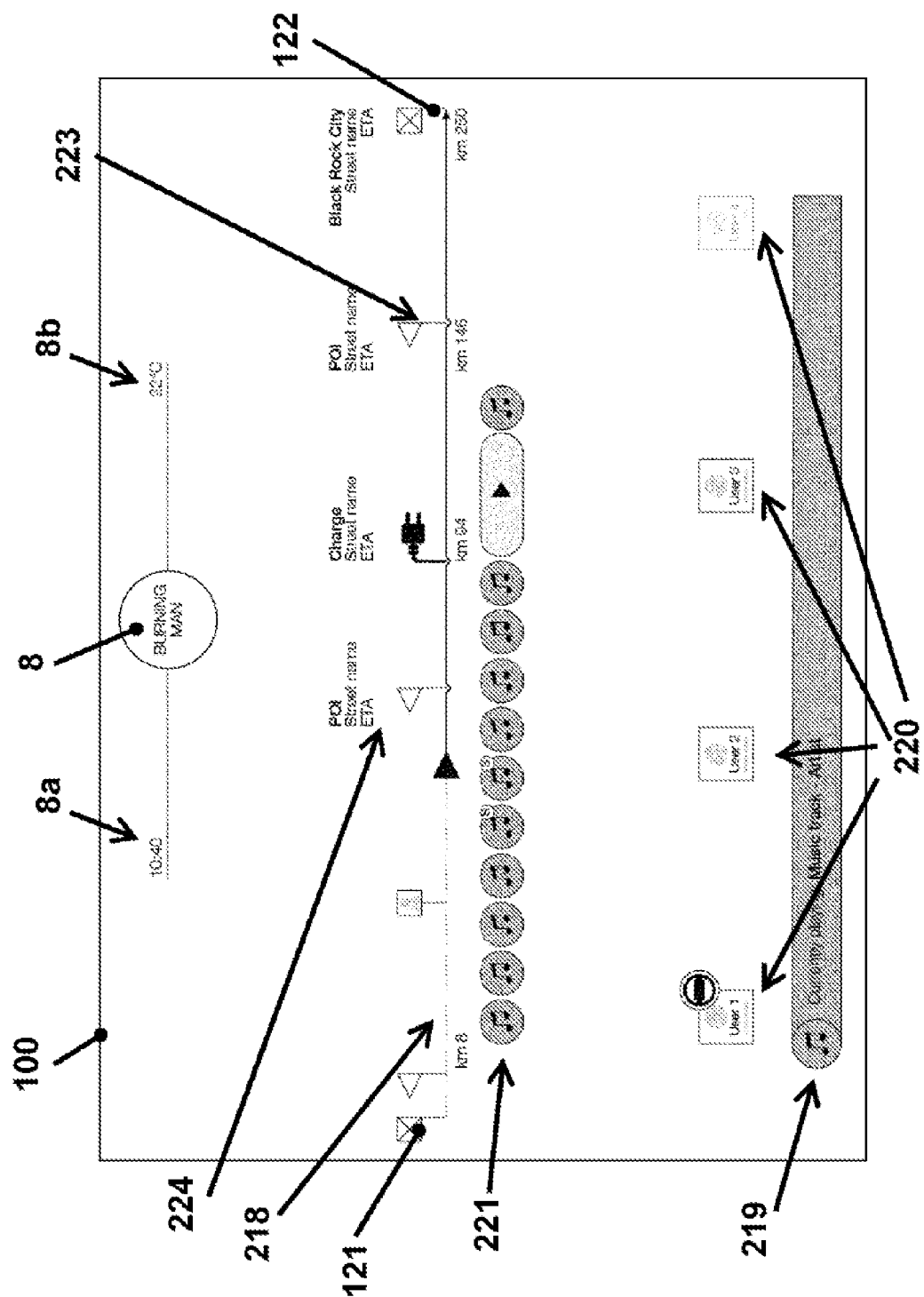

With regard to FIGS. 6 to 8, displays for the cooperative planning of intermediate destinations of a trip are explained. Here, the exemplary embodiment of the disclosed system and disclosed method explained above is proceeded from.

Display 100 represented in FIG. 6 enables the user to find and insert geographical planning objects, in particular, intermediate destinations for the navigation (points of interest, POI). In the exemplary embodiment represented, this takes place in a private mode, the process of the search and the generation of the proposal thus initially only being able to be seen by the respective user. The button "Go public" 125 at the upper edge of display 100 then enables a proposal to be made public, whereby the user switches into the public mode by actuating this button.

Display 100 in FIG. 6 comprises a map display 210 of the planned route. The user can select a location along map display 210 by an input, for example, by touching touchscreen 4. By positioning a sliding element 211b along a scale 211a, a radius can be set. A circle is displayed around the previously determined position in map display 210, the circle corresponding to the set radius. In a POI list 212 beside map display 210, intermediate destinations within the selected radius are displayed, for example, restaurants and/ or tourist attractions along the planned route. A search can also be made, for example, using keywords, by an input field "Search" 213.

The representation of the list of POIs in POI list 212 can take place in various ways known per se, for example, with a sequence according to relevance or distance from the route or with a categorization, wherein, for example, POIs of a specific type are grouped together, for example, all the restaurants. Furthermore, the represented POIs can be provided with further information, for example, by a distance symbol 215, which indicates the distance from the planned route or the length of the detour required up to arrival. Furthermore, it can be displayed using a user image 101 which other users of the system have already proposed a POI.

To include, to publish a proposal, a POI in the planned route, the user can, for example, actuate the button "Go public" 125. The proposal is then transmitted and outputted to other participant devices 2.1, 2.2, 4.

Display 100 shown in FIG. 7 can be displayed, for example, by a touchscreen 4. It is assumed that the latter is assigned to the driver as a participant device and that the addition of a geographical planning object, in the present case of a POIs, requires a confirmation by the driver. Display 100 comprises a symbolic representation 218 of the planned route with symbols for starting position 123 and destination position 122 as well as intermediate destinations 223. Furthermore, the position of requested intermediate destination 222 is displayed, wherein the display takes place by methods known per se, such that this symbol of requested intermediate destination 223 is marked, for example, by a special symbol or color highlighting. Display 100 further comprises a pop-up with a proposal message 216.

The representation also comprises further displays, for example, a symbolic representation of a playlist for multimedia contents 221, which will be explained in greater detail below. Furthermore, media reproduction information 219 is displayed, which includes a title of a piece of music just played. Furthermore, participant symbols 220 are represented for the participants of the trip, wherein participant symbol 220 is highlighted for the driver by a symbolic representation of a steering wheel.

The user, in the case represented the driver of transportation vehicle 1, uses touchscreen 4 as a user device and can accept the proposed POI by an actuating action, for example, by actuating a switch or a button, which can optionally be included in display 100.

FIG. 8 shows display 100 proceeding from the case represented in FIG. 7, but after acceptance of the proposed POI by the driver. The symbolic representation of planned route 218 is supplemented by newly inserted intermediate destination 224.

With regard to FIGS. 9 to 12, the management of a playlist is explained. The exemplary embodiment of the disclosed system and disclosed method explained above is proceeded from.

A common playlist for multimedia contents is generated cooperatively during a trip. Display 100 represented in FIG. 9 comprises a user interface with an upper region with trip name 8 and information concerning current time 8a and temperature 8b. It further comprises a list of music titles 304, wherein the currently played music title 304a is specially highlighted, here by bold print. By an input field 302, a search enquiry for a multimedia content, in particular, a music title, can be inputted.

Figure 9:
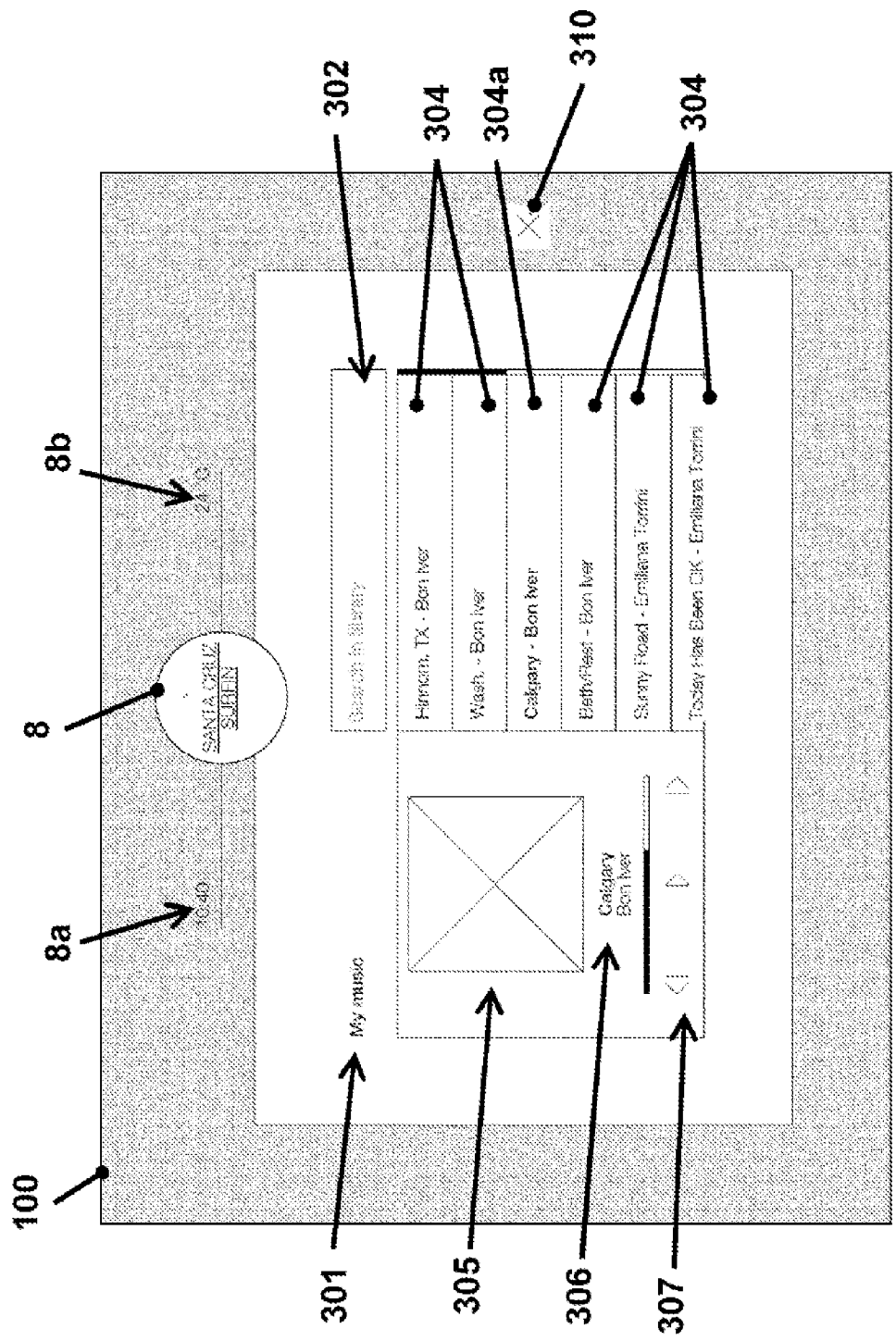
FIGS. 9, 10, 11, and 12 show displays for the management of a playlist.

Display 100 in FIG. 9 also comprises a representation of information concerning the current reproduction of currently played music title 4a with a cover representation 305 with an image for music title 4a, name 306 of the piece and user interfaces for controlling the playing 307. Furthermore, user name 301 is displayed, in this case it is the user himself who is accessing his own multimedia contents.

In display 100 represented in FIG. 9, the user can add a music title from the list for the trip by a movement gesture, for example, in a known manner by moving a list entry 304, 304a by touch screen 4 into the region of trip name 8. This title can be displayed, for example, in a symbolic representation of playlist 221, as shown in FIG. 8. The assignment to the travel plan is achieved by the spatial assignment of a planning object, here a list entry 304 which is linked to a multimedia content, to a symbol for route 8.

Figure 10:
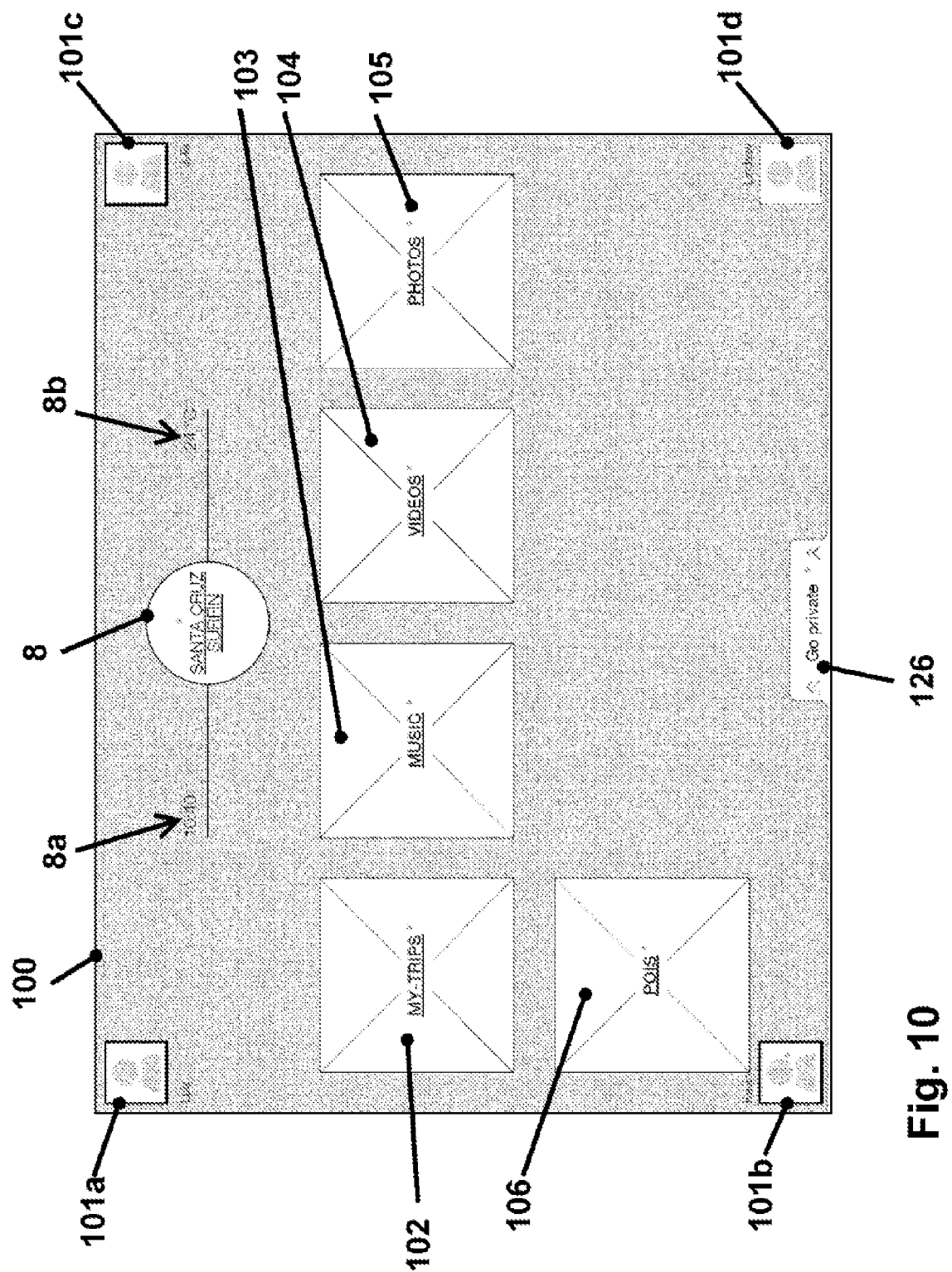

FIG. 10 shows the possibility of accessing planning objects of other users by using a public mode. Display 100 represented here comprises a button "Go private" 126, by the actuation whereof the user can switch into the private mode. User images 101a, 101b, 101c, 101d are represented in display 100, by which users participating in the trip can be recognized. User images 101a to 101d can be constituted as buttons, wherein, for example, the multimedia contents this selected user can be reached, for example, by actuating one of these buttons.

Display 100 in FIG. 10 further comprises, similar to display 100 represented in FIG. 2, buttons "My Trips" 102, "Music" 103, "Videos" 104, "Photos" 105 and "POIs" 106. By the latter, individual user interfaces can be retrieved for managing the planning objects assigned to these contents for the travel plan.

Figure 11:
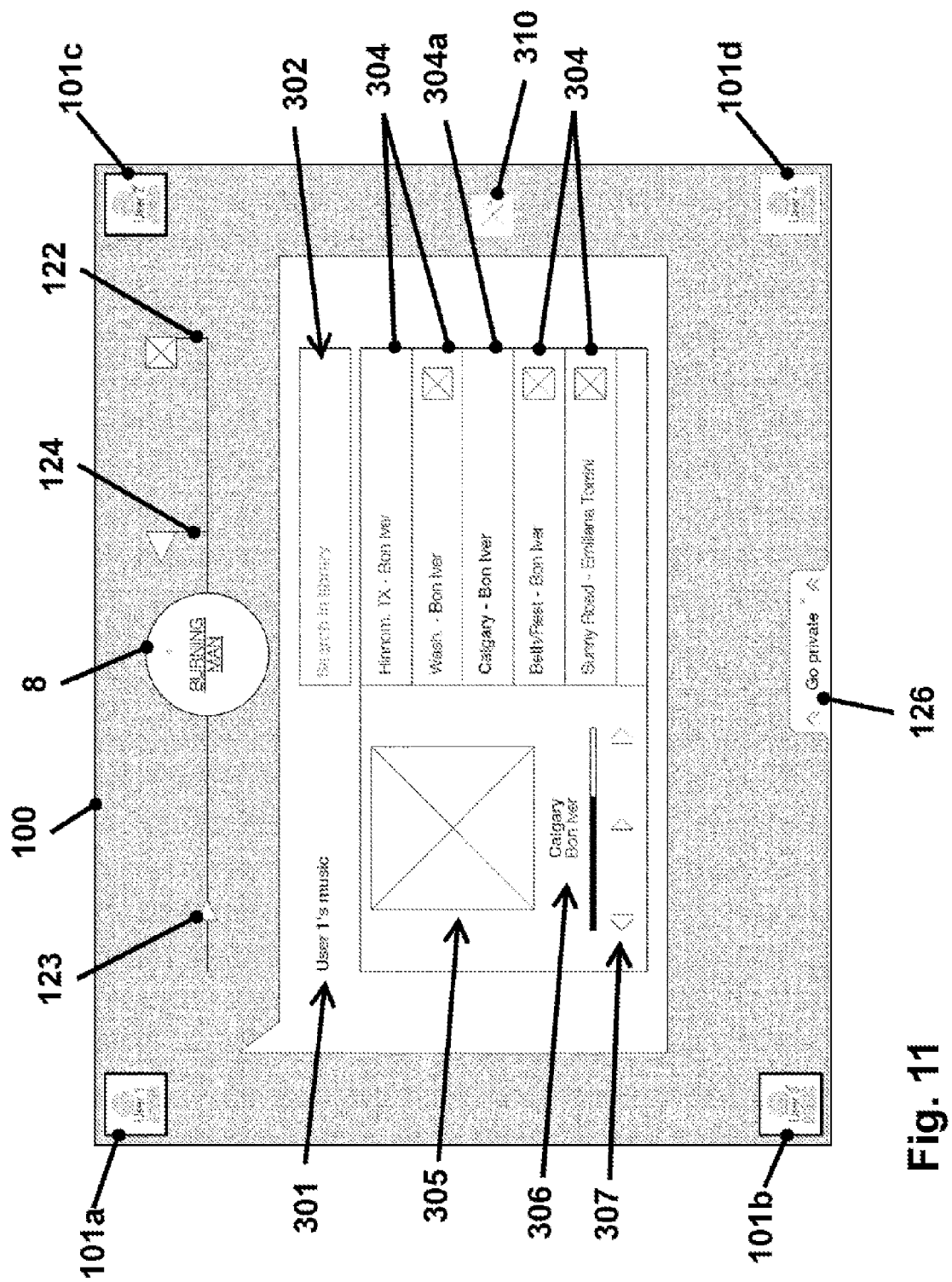

Display 100 represented in FIG. 11 is constituted similar to display 100 described above by reference to FIG. 9. Here, however, the public mode is active and it is possible to switch into the private mode by actuating the button "Go private" 126.

A common playlist for multimedia contents for the trip can be processed cooperatively here, wherein display 100 is constituted as a user interface, wherein a symbol with trip name 8 and a symbolic representation of the route as a line with current position 123 and a destination position 122 as well as an intermediate destination 124 is displayed in the upper region. By user name 301, it is indicated that music titles are displayed here which are assigned to user "User 1". As already described with regard to FIG. 9, multimedia contents can be searched by a search term and input field 302 and music titles 304, 304a are displayed in a list. These list entries 304, 304a can be linked to the route by a user action, which comprises a movement towards the route, and can be added to a common playlist. A supplement to the existing playlist can, for example, take place, in that a list entry 304, 304a is moved to trip name 8, or playing at a specific position along the route can be specified, if list entry 304, 304a is pushed into a region of the symbolically represented route.

Figure 12:
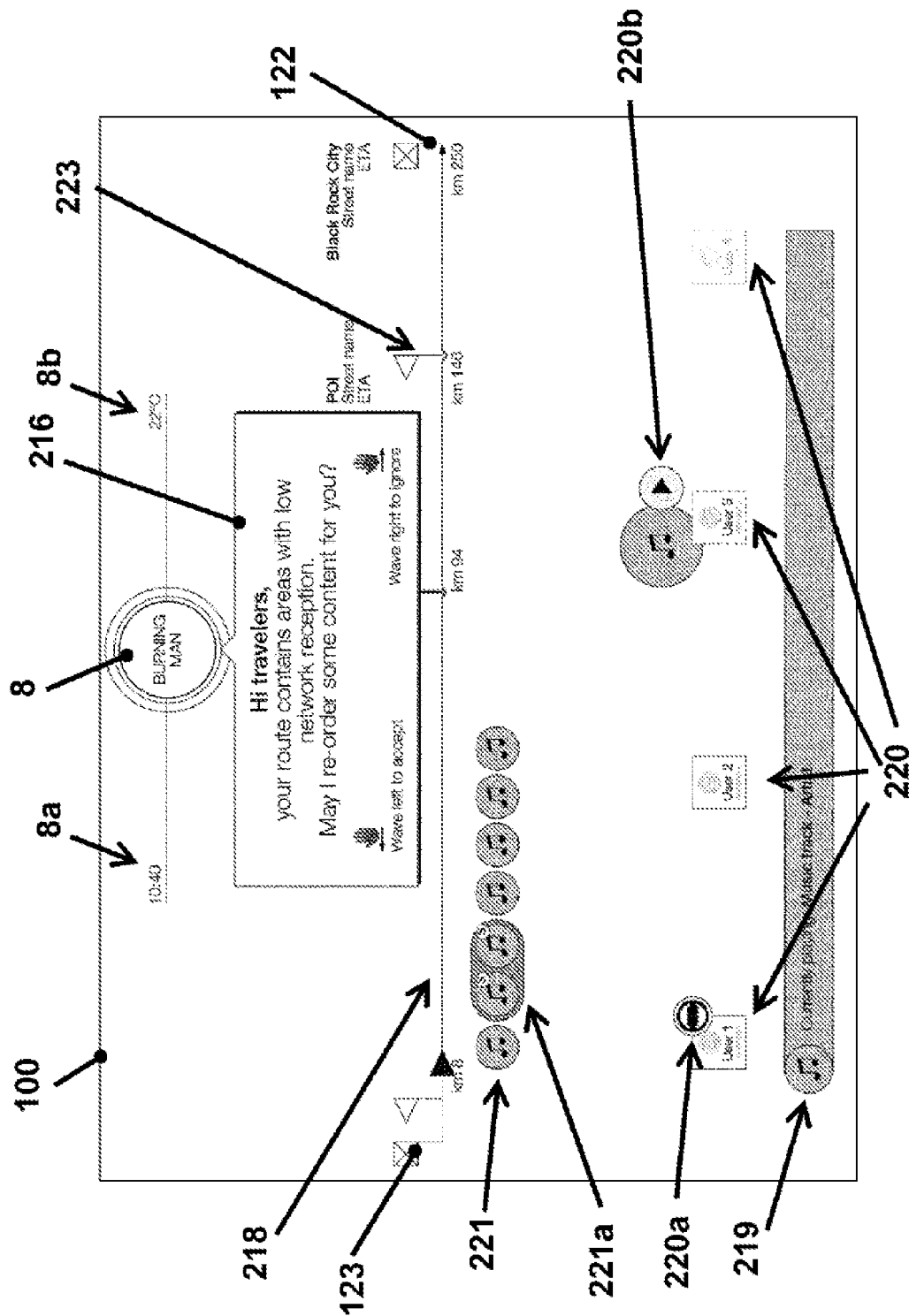

A display 100 is represented in FIG. 12 in the case where playlist 221 represented symbolically here comprises planning objects which are linked to stream multimedia contents 221a, for which a connection to an external server, for example, has to be produced for playing. For example, it may be an Internet radio station or a video retrieved from the Internet. In this example, the system recognizes during the trip, for example, on the basis of data of navigation device 6, that transportation vehicle 1 is located in an area with poor reception conditions, for example, when travelling through a tunnel. A pop-up 216 is displayed with an enquiry as to whether the elements of the playlist are to be a rearranged such that playing is possible on the basis of the given planning objects, for example, whereby the playing of the media contents which can be played over the Internet is postponed to a later time when a better Internet connection is expected to be present. The user is requested to make a user input, in this case a gesture with the hand, to accept or decline this proposal.

Display 100 represented in FIG. 12 also demonstrates, by way of example, the display of participant symbols 220 with additional information, i.e., a symbolically represented steering wheel 220a to identify the driver and a media contributions symbol 220b, by which it can, for example, be displayed how much the various users have contributed to the creation of the playlist or whether just one multimedia content of a specific user is outputted.

Figure 13:
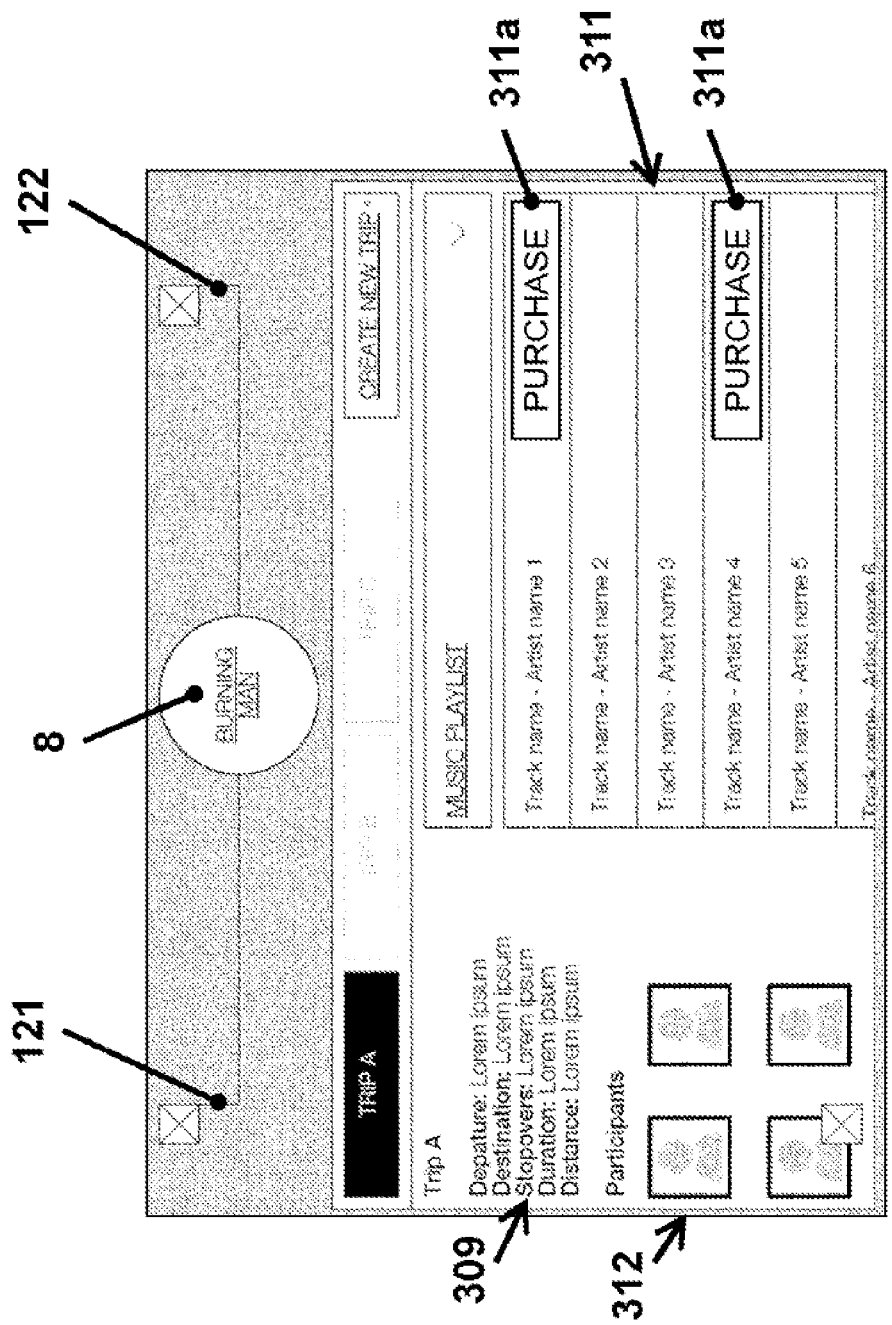
FIGS. 13 and 14 show displays for drawing up a travel diary.
Figure 14:
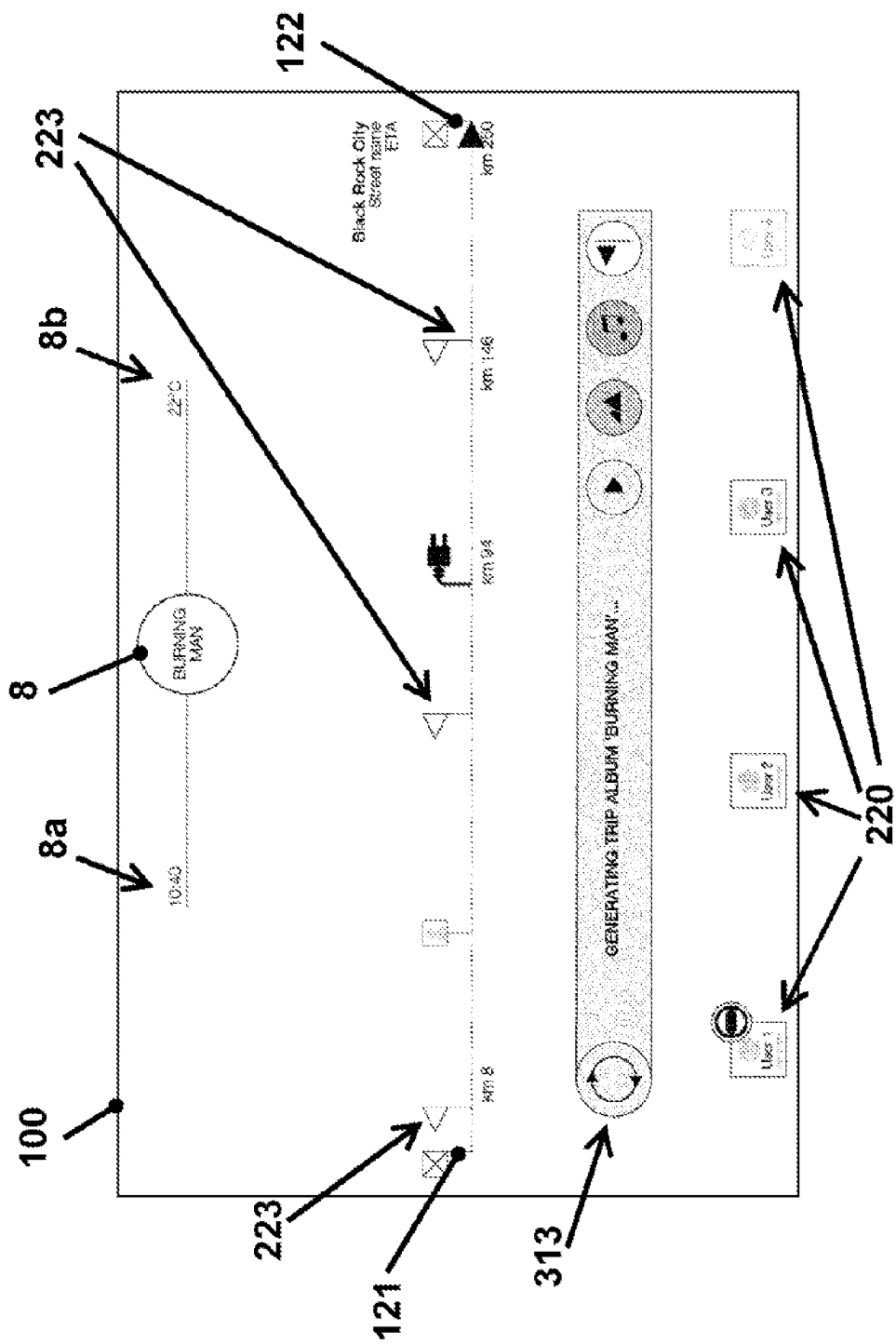

With regard to FIGS. 13 and 14, the drawing up of a trip diary is explained. The exemplary embodiment of the disclosed system and disclosed method invention explained above is proceeded from.

A summary of central data of the travel plan is shown using display 100 represented in FIG. 13, wherein these data can be used, for example, to draw up the trip diary. This display 100 can be represented when the button "My Trips" 102, as represented in FIG. 2, for example, has been actuated. Display 100 comprises in the upper region a symbolic representation of the route with trip name 8, starting position 121 and the destination position 122. Furthermore, it comprises a summary of trip data 309, for example, central time data such as time of departure and time of arrival. It also comprises a participant list 312, which in the represented example is generated on the basis of previously described user images 101a to 101d and in addition to this can comprise further symbols, for example, if the users have performed various functions during the trip. Furthermore, a summary of playlist 311 is displayed, wherein the music titles played one after the other, for example, are displayed here. Further information can be linked to the list elements, such as the precise time and the precise location at which the music title was reproduced during the trip. Furthermore, additional functions can be linked to the list elements, in the present case, for example, "Purchase" buttons 311a. By actuating "Purchase" buttons 311a, the user is able to acquire a music title which was played during the trip, but which he does not yet own himself.

If a trip diary, for example, based on data represented in FIG. 13, is to be generated, a display as in FIG. 14 takes place in the exemplary embodiment. In the first place, a user input can be sensed, by which the trip diary is generated, or the generation can be initiated automatically at the end of the trip.

In the case of display 100 represented in FIG. 14, data similar to the case represented, for example, in FIG. 8 are essentially outputted: in an upper region, trip name 8 and information concerning current time 8a and temperature 8b are outputted. Furthermore, a symbolic representation of the route is displayed with start 121 and destination 122 as well as intermediate destinations 223. Furthermore, a generation message 313 is represented, wherein information is represented to the effect that the generation of the travel plan is just taking place, the contents whereof are included and, for example, further information such as a remaining time for the generation.

Furthermore, an output of the trip diary can take place, for example, by export in a document format and sending to one of mobile devices 2.1, 2.2 or by sending by e-mail. Various file formats can be used, including, for example, presentation or video formats. Furthermore, data of the travel plan can be outputted in a raw format, which comprises data having been processed to a small extent and by which other devices can, for example, generate a trip diary independently. Furthermore, a direct output can take place, for example, by touchscreen 4 of transportation vehicle 1, and a possibility for processing the trip diary can also be made available on the basis of user inputs.

LIST OF REFERENCE NUMBERS 1 transportation vehicle
2.1 mobile device
2.2 mobile device
2.1a, 2.2a display unit
2.1b, 2.2b input unit
3 control unit
4 touchscreen
5 media reproduction device
6 navigation device
8 trip name
8a time
8b temperature
100 display
101, 101a, 101b, 101c, 101d user image
102 button "My Trips"
103 button "Music"
104 button "Videos"
105 button "Photos"
106 button "POIs"
107 invitation message
108 button "accept"
109 button "decline"
110 button "Details"
111 message window
111a instant messages
111b message input field
112 button "New Task"
113 task object
115 planning contributions
121 starting position (symbolic)
122 destination position (symbolic)
123 current position
125 button "Go public"
126 button "Go private"
130 note field
131 button "Add Note"
132 button "Cancel"
135 display field
210 map display
211a radius adjuster (scale)
211b radius adjuster (sliding element)
212 POI list
213 input field "POI search"
215 distance symbol
216 pop-up
218 symbolic route representation
219 multimedia reproduction information
220 participant symbols
220a steering wheel symbol
220b media contributions (symbol)
221 playlist (symbolic)
221a stream multimedia content 222 intermediate destination (requested)
223 intermediate destination (symbolic)
224 new intermediate destination (symbolic)
301 user name
302 input field "multimedia search"
304 music title (list entry)
304a currently played music title (list entry)
305 cover representation
306 name of piece
307 user interfaces multimedia
309 trip data
310 button "Close"
311 playlist (summary)
311a "Purchase" button
312 passenger list
313 generation message

The invention claimed is:

1. A method for cooperatively generating and managing a travel plan for a transportation vehicle by at least two user devices, the method comprising:
at least one of the user devices sensing a starting position and a destination position, the at least one device further generating the travel plan that includes at least one route from the starting position to the destination position and a list of planning objects which are assigned to the route;
a first of the at least two user devices generating a participant enquiry for each of the remaining at least two user devices, the first user device transmitting the participant enquiry to each remaining user device, wherein the participant enquiry is outputted by the remaining user device, and a subsequent user input is sensed as an acceptance of the participant enquiry, wherein the first user device, and the user devices that have sensed acceptance, are deemed to be participant devices;
generating, by a participant device, a display based on the travel plan, and outputting the display to a user interface, wherein travel plan supplementary data are acquired by an input unit of the participant device, wherein the route is assigned at least one further planning object or a planning object assigned to the route is removed based on the acquired travel plan supplementary data;
repeating the generation and outputting of the display for as long as further travel plan supplementary data are acquired, wherein the acquired travel plan supplementary data are thereby updated, wherein the repeating and outputting is terminated in response to the publication of a proposal by the user;
subject to sensed acceptance, updating the travel plan based on the acquired travel plan supplementary data, wherein the route and/or the list of the planning objects are newly generated, to thereby produce an updated travel plan;
generating and transmitting a control signal based on the updated travel plan and to a navigation device of the transportation vehicle; and
repeating generation and output of the display using the updated travel plan, and
further updating the updated travel plan and generating and transmitting the control signal as long as further travel plan supplementary data are acquired,
wherein one participant device is operated as a driver device, and other participant devices operated as passenger devices,
wherein a confirmation enquiry is generated and outputted by the driver device based on the travel plan supplementary data, and
wherein an acceptance of the confirmation enquiry is sensed by the driver device.

2. The method of claim 1, wherein the travel plan supplementary data comprise planning objects with geographical destinations wherein, based on the travel plan supplementary data, the geographical destinations are added as intermediate destinations on the route during the updating of the travel plan.

3. The method of claim 1, wherein the planning objects comprise links to multimedia contents.

4. The method of claim 3, wherein a playlist of the multimedia contents is generated for a media reproduction device of the transportation vehicle in response to the list of planning objects of the travel plan comprising links to multimedia contents.

5. The method of claim 1, wherein the user interface comprises a representation of the route.

6. The method of claim 1, wherein the user interface comprises user elements, wherein a planning object is assigned to each user element, and the user elements are arranged as list entries of a list.

7. The method of claim 6, wherein at least a partial number of the list entries of the list is assigned to planning objects with geographical destinations, wherein the list entries of the geographical destinations are generated based on a distance from the route and/or a geographical location on the route.

8. The method of claim 1, wherein at least one of the user devices is a transportation vehicle-external mobile device.

9. The method of claim 1, wherein travel plan supplementary data, which have been acquired from one of the participant devices, are transmitted to another participant device and displayed by the other participant device, wherein it is indicated which planning object of the travel plan supplementary data has been sensed by which participant device.

10. The method of claim 1, wherein:
message data are acquired via the participant device;
the message data are transmitted to at least one other participant device; and,
the message data are outputted by the other participant device.

11. The method of claim 1, wherein task data are assigned to the participant device and the user interface comprises a task display, wherein information concerning the task data and the assigned participant device are outputted.

12. The method of claim 1, wherein the travel plan is stored, a travel diary request is received, and travel diary data are generated and outputted based on the travel diary request and the stored travel plan, and wherein the travel diary data comprise the route and at least a partial number of the planning objects of the travel plan.

13. The method of claim 12, wherein the travel diary data comprise at least one link to multimedia contents, wherein a functionality is assigned to the link.

14. The method in of claim 12, wherein the travel diary data are constituted by a file format, a document format, a multimedia format or a presentation format.

15. The method of claim 12, wherein a user input is sensed, the travel diary data are updated based on the sensed user input, and the updated travel diary data are outputted.

16. A system for cooperatively generating and managing a travel plan, wherein the system comprises:
a transportation vehicle and at least two user devices, wherein the transportation vehicle includes a navigation system and a control unit, wherein the user devices each include an output unit and an input unit, wherein a starting position and a destination position are sensed by the input unit of a first of the at least two user devices, wherein the travel plan is generated that includes at least a route from the starting position to the destination position and a list of planning objects which are assigned to the route, wherein a participant enquiry is generated by the first of the user devices for each of the remaining at least two user devices and is transmitted to each remaining user device, wherein the participant enquiry is output by the remaining user device, and a subsequent user input is sensed as an acceptance of the participant enquiry, wherein the first user device, and the user devices for which an acceptance has been sensed, are deemed to be participant devices, wherein a display is generated and outputted by a participant device based on the travel plan, wherein the display includes a user interface, wherein travel plan supplementary data is acquired by an input unit of the participant device, wherein at least one further planning object is assigned to the route or a planning object assigned to the route is removed, and wherein the travel plan is updated based on the acquired travel plan supplementary data, wherein the route and/or the list of the planning objects is newly generated, the travel plan is accepted by the driver device, a control signal is generated based on the travel plan, and the control signal transmitted at least to the navigation device of the transportation vehicle, wherein one participant device is operated as a driver device, and other participant devices operated as passenger devices, wherein a confirmation enquiry is generated and outputted by the driver device based on the travel plan supplementary data, and wherein an acceptance of the confirmation enquiry is sensed by the driver device.

17. The system of claim 16, wherein the travel plan is stored, a travel diary request is received by a sensing unit, and travel diary data is generated and outputted based on the travel diary request and the stored travel plan, and wherein the travel diary data include the route and at least a partial number of the planning objects of the travel plan.

\* \* \* \* \*